(12) United States Patent
Gratton et al.

(10) Patent No.: US 9,608,538 B2
(45) Date of Patent: Mar. 28, 2017

(54) COMMON ZERO VOLT REFERENCE AC / DC POWER SUPPLY WITH POSITIVE AND NEGATIVE RECTIFICATION AND METHOD OF OPERATION THEREOF

(71) Applicant: Distech Controls inc., Brossard (CA)

(72) Inventors: Pascal Gratton, Montreal (CA); Christian Delvar, Saint Germain Nuelles (FR); Paul Rouviere, Grezieu la Varenne (FR)

(73) Assignee: Distech Controls Inc., Brossard, Quebec (CA)

( * ) Notice: Subject to any disclaimer, the term of this patent is extended or adjusted under 35 U.S.C. 154(b) by 14 days.

(21) Appl. No.: 14/576,415

(22) Filed: Dec. 19, 2014

(65) Prior Publication Data

US 2016/0181941 A1    Jun. 23, 2016

(51) Int. Cl.
*H02M 7/217*    (2006.01)

(52) U.S. Cl.
CPC .................. *H02M 7/217* (2013.01)

(58) Field of Classification Search
CPC ........ H02M 7/00; H02M 7/217; H02M 7/219; H02M 7/06; H02M 7/10; H02M 7/153; H02M 7/12; H02M 1/4208; H02M 1/4585; H02M 1/4233; H02M 5/4585; H02M 3/33592
USPC ................. 363/67, 81, 84, 125–127
See application file for complete search history.

(56) References Cited

U.S. PATENT DOCUMENTS

| | | | | |
|---|---|---|---|---|
| 3,229,111 | A * | 1/1966 | Schumacher | H02J 9/062 307/415 |
| 3,716,771 | A * | 2/1973 | Maynard | H02P 7/2815 388/820 |
| 4,816,736 | A * | 3/1989 | Dougherty | H02J 7/1423 320/116 |
| 5,821,790 | A * | 10/1998 | Sweetman | H03K 5/082 327/184 |
| 6,021,499 | A * | 2/2000 | Aleshi | G06F 1/26 363/15 |
| 9,198,245 | B2 * | 11/2015 | Deng | H05B 33/0815 |
| 2005/0146308 | A1 * | 7/2005 | Quazi | B60L 11/02 322/28 |
| 2010/0177536 | A1 * | 7/2010 | Liu | H02M 3/33592 363/17 |
| 2012/0008354 | A1 * | 1/2012 | Tang | H02M 1/32 363/126 |

* cited by examiner

*Primary Examiner* — Adolf Berhane
(74) *Attorney, Agent, or Firm* — RatnerPrestia

(57) ABSTRACT

A common zero volt reference AC/DC power supply with positive and negative rectification, and method of operation thereof. The power supply comprises an input for receiving an AC input voltage and an output for outputting a DC output voltage, the AC input and DC output having a common zero volt reference. The power supply comprises a first rectifier and a second rectifier, for respectively performing a half-wave rectification of a positive half cycle and negative half cycle of the AC input voltage. The power supply comprises control logic for detecting the negative half cycle of the AC input voltage and activating the second rectifier upon the detection. The power supply comprises a power converter for converting a DC rectified voltage received from at least one of the first and second rectifiers into the DC output voltage.

19 Claims, 9 Drawing Sheets

COMMON ZERO VOLT REFERENCE AC / DC POWER SUPPLY WITH POSITIVE AND NEGATIVE RECTIFICATION AND METHOD OF OPERATION THEREOF

TECHNICAL FIELD

The present disclosure relates to the field of AC/DC power supplies with power rectification capabilities. More specifically, the present disclosure presents a common zero volt reference AC/DC power supply with positive and negative rectification, and a method of operation of the power supply.

BACKGROUND

A first type of alternative current (AC)/direct current (DC) power supply only provides half-wave rectification of a positive half cycle of an AC input voltage of the power supply. Alternatively, only half-wave rectification of a negative half cycle of the AC input voltage may also be performed. Consequently, the input energy corresponding to the non-rectified half cycle is lost.

Another type of AC/DC power supply provides full-wave rectification of both the positive half cycle and the negative half cycle of an AC input voltage of the power supply. For instance, the full-wave rectification is implemented by a diode bridge. The power efficiency of the power supply is improved, since it is capable of recovering the input energy corresponding to both rectified (positive and negative) half cycles. However, such power supplies usually have their AC input having an input zero volt reference, and their DC output having an output zero volt reference different from the input zero volt reference.

Therefore, there is a need for a common zero volt reference AC/DC power supply with positive and negative rectification, and a method of operation of the power supply.

SUMMARY

According to a first aspect, the present disclosure provides a common zero volt reference AC/DC power supply with positive and negative rectification. The power supply comprises an input for receiving an alternating current (AC) input voltage. The power supply comprises an output for outputting a direct current (DC) output voltage. The AC input voltage and the DC output voltage have a common zero volt reference. The power supply comprises a first rectifier for performing a half-wave rectification of a positive half cycle of the AC input voltage. The power supply comprises a second rectifier for performing a half-wave rectification of a negative half cycle of the AC input voltage. The power supply comprises control logic for detecting the negative half cycle of the AC input voltage and activating the second rectifier upon detection of the negative half cycle of the AC input voltage. The power supply comprises a DC/DC power converter for converting a DC rectified voltage received from at least one of the first and second rectifiers into the DC output voltage.

According to a second aspect, the present disclosure provides a method of operating a common zero volt reference AC/DC power supply with positive and negative rectification. The method comprises receiving an alternating current (AC) input voltage at an input of the power supply. The method comprises performing a half-wave rectification of a positive half cycle of the AC input voltage by a first rectifier. The method comprises detecting a negative half cycle of the AC input voltage and activating a second rectifier upon detection of the negative half cycle of the AC input voltage. The method comprises performing a half-wave rectification of the negative half cycle of the AC input voltage by the second rectifier. The method comprises converting a DC rectified voltage received from at least one of the first and second rectifiers into a direct current (DC) output voltage by a DC/DC power converter. The method comprises outputting the DC output voltage at an output of the power supply. The AC input voltage and the DC output voltage have a common zero volt reference.

BRIEF DESCRIPTION OF THE DRAWINGS

Embodiments of the disclosure will be described by way of example only with reference to the accompanying drawings, in which.

DETAILED DESCRIPTION

The foregoing and other features will become more apparent upon reading of the following non-restrictive description of illustrative embodiments thereof, given by way of example only with reference to the accompanying drawings.

Various aspects of the present disclosure generally address one or more of the problems related to power rectification for alternating current (AC)/direct current (DC) power supplies.

Figure 1A:
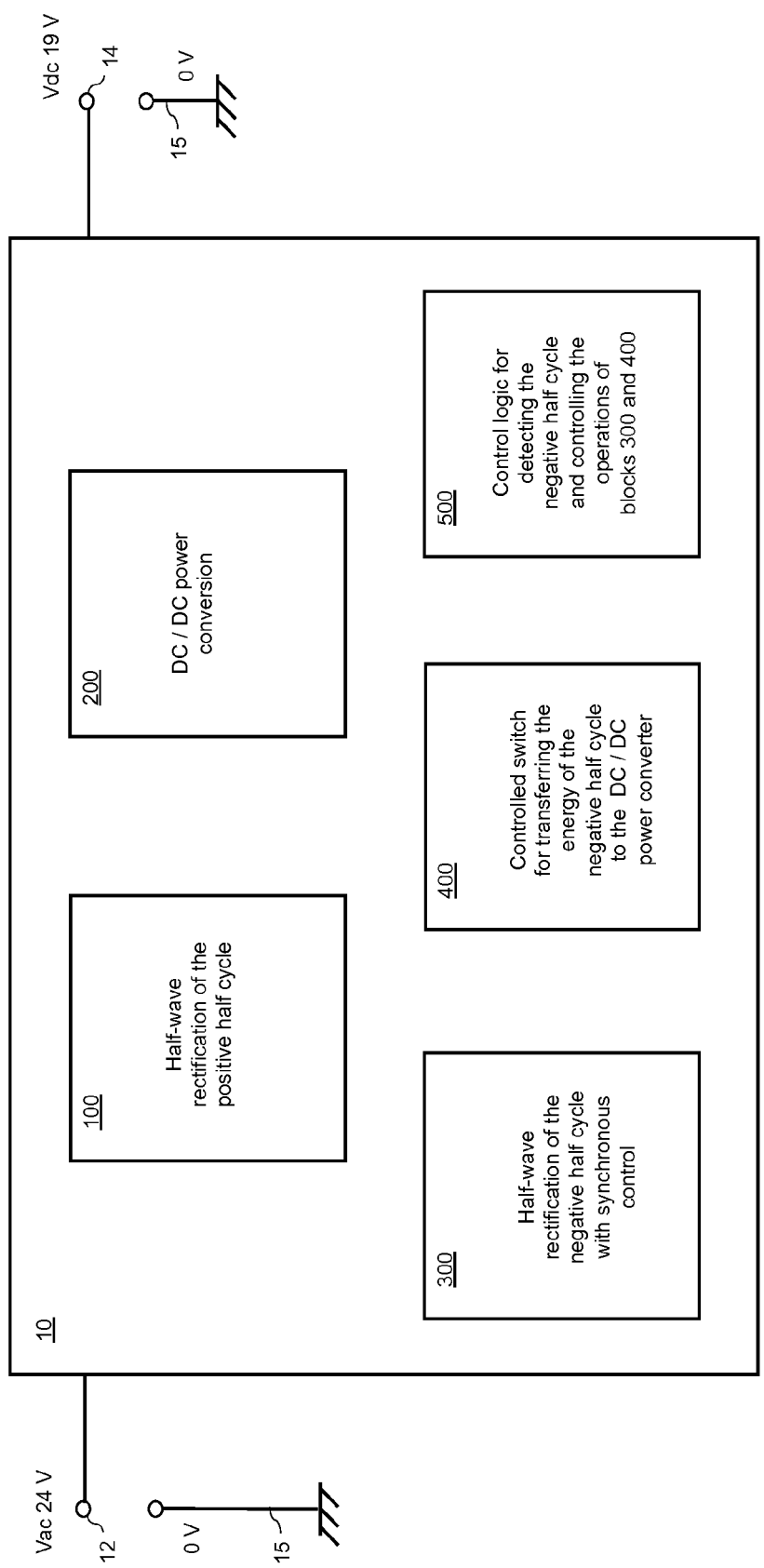
FIG. 1A represents an exemplary block diagram of a common zero volt reference AC/DC power supply with positive and negative rectification.
Figure 1B:
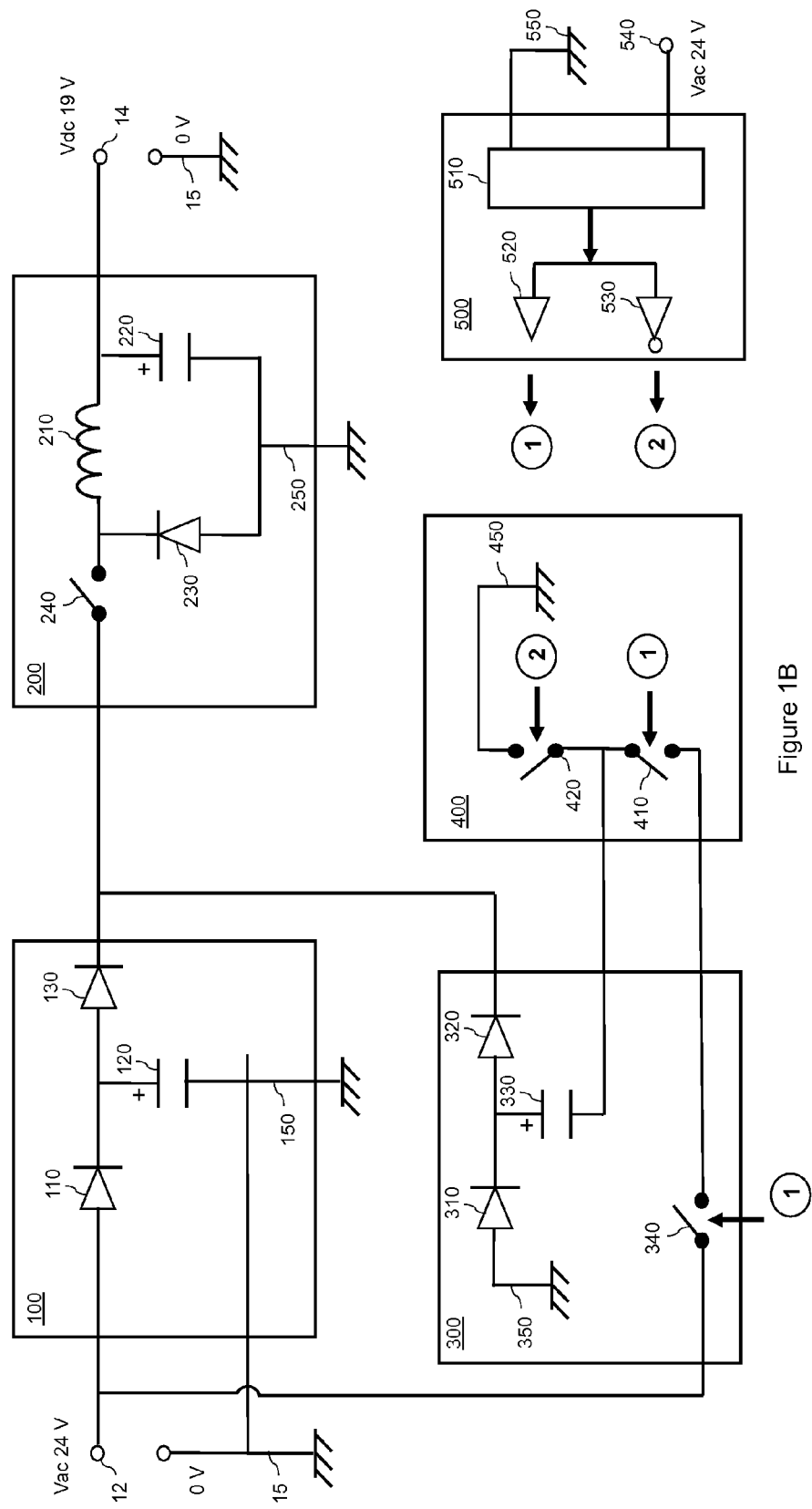
FIG. 1B represents detailed functional blocks of the power supply of FIG. 1A.
Figure 4:
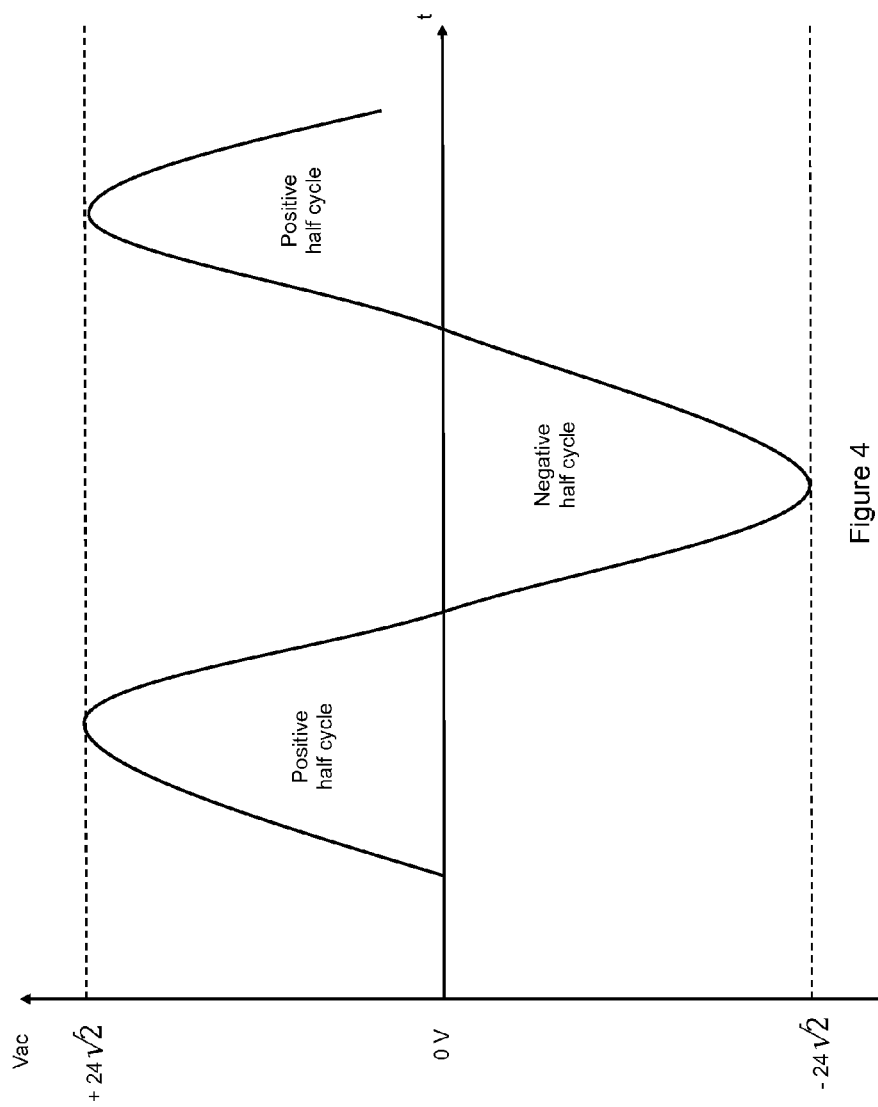
FIG. 4 illustrates an AC voltage signal having positive and negative half cycles.

Referring now to FIGS. 1A, 1B and 4, a common zero volt reference AC/DC power supply 10 with positive and negative rectification is represented. The power supply 10 comprises an AC input voltage 12 and a DC output voltage 14. The AC input voltage 12 alternates positive and negative half cycles (represented in FIG. 4). In the example illustrated in FIGS. 1A and 4, the AC input voltage 12 is a 24 volts (V) AC voltage. A 24 V AC voltage has a root mean square value of 24 V, and has a time-averaged delivered power equivalent to the power delivered by a DC voltage of 24 V. The 24 V AC voltage varies between a maximum of +24.$\sqrt{2}$ V and a minimum of −24.$\sqrt{2}$ V. The DC output voltage 14 is set to a fixed value of 19 V. The DC output voltage 14 may have another fixed value. For example, the DC output voltage 14 may have a value between 0 and 30 V. The value of the AC input voltage 12 is adapted to match the value of the DC output voltage 14. The aforementioned values for the AC input voltage 12 and the DC output voltage 14 are for illustration purposes only. These values may vary based on the type of equipment (not represented in the Figures) providing the AC input voltage 12 to the power supply 10, and the type of electronic device (not represented in the Figures) receiving the DC output voltage 14.

The power supply 10 comprises five functional blocs 100, 200, 300, 400 and 500. Blocs 100 and 200 are traditionally used in a power supply with half-wave rectification. Bloc 100 provides half-wave rectification of the positive half cycle of the AC input voltage 12. Bloc 200 provides DC/DC power conversion (voltage step down). Blocs 300, 400 and 500 provide for retrieving and storing energy during the negative half cycle of the AC input voltage 12, and for transferring this energy to bloc 200, to perform the DC/DC power conversion of this energy. The power supply 10 provides the same functionality as a full-wave rectifier, allowing recovery of the energy of both the positive and negative half cycles of the AC input voltage 12. However, in contrast to an implementation providing full-wave rectification (e.g. by means of a diode bridge), the present power supply 10 provides a common zero volt reference 15 (generally also referred to as a ground reference) between the AC input voltage 12 and the DC output voltage 14. Furthermore, a galvanic isolation between the AC input 12 and the DC output 14 is not required for the present power supply 10, in contrast to an isolated power supply (implementing an isolation of the AC input from the DC output) providing full-wave rectification.

The common zero volt reference between the AC input voltage 12 and the DC output voltage 14 is represented in the Figures by using the same reference number 15. Additionally, as will be detailed later in the description, each of the blocs 100, 200, 300, 400 and 500 also has a zero volt reference (respectively 150, 250, 350, 450 and 550), some of which or alternatively all of which can also be shared with the common zero volt reference 15.

Compared to implementations where the AC input and the DC output are isolated, the present power supply 10 provides a smaller form factor (e.g. smaller housing), a better efficiency, an increased power output, and a common zero volt reference 15 between the AC input 12 and the DC output 14 that is usually only possible for implementations providing half-wave rectification only.

Bloc 100 performs half-wave rectification of the positive half cycle, and comprises two diodes 110 and 130, and a capacitor 120. An input of bloc 100 corresponds to the AC input voltage 12. An output of bloc 100 is connected to an input of bloc 200, and provides a first rectified DC voltage to bloc 200. Bloc 100 also comprises the zero volt reference 150, which is common with the zero volt reference 15 as illustrated for example in FIG. 1B.

Bloc 200 performs DC/DC power conversion, and comprises a switch 240, an inductance 210, a capacitor 220, a diode 230, and the zero volt reference 250 (common with the zero volt reference 15, although not represented as such in the Figures for simplification purposes). Bloc 200 also comprises a power controller (not represented in the Figures for simplification purposes) commanding the switch 240, for controlling the DC/DC power conversion performed by bloc 200. An output of bloc 200 corresponds to the DC output voltage 14. The input of bloc 200 is connected to the output of bloc 100 for receiving the first rectified DC voltage corresponding to the positive half cycle, and to an output of bloc 300 for receiving a second rectified DC voltage corresponding to the negative half cycle. A buck-type converter is represented in FIG. 1B, for performing the DC/DC power conversion of bloc 200. A buck-type converter is well known in the art, in particular the transitions of the switch 240 between an opened and a closed position for controlling the operations of the buck converter. However, other types of DC/DC power converters may be used in place of the buck-type converter represented in FIG. 1B.

Bloc 300 performs half-wave rectification of the negative half cycle with synchronous control by bloc 500, and comprises two diodes 310 and 320, a capacitor 330, a switch 340, and the zero volt reference 350 (common with the zero volt reference 15, although not represented as such in the Figures for simplification purposes). An output of bloc 300 is connected to the input of bloc 200, and provides the second rectified DC voltage to bloc 200.

Bloc 400 performs a transfer of the energy of the negative half cycle to bloc 200 (to perform DC/DC power conversion of the energy recovered from the negative half cycle) under the control of bloc 500. Bloc 400 comprises two switches 410 and 420, and the zero volt reference 450 (common with the zero volt reference 15, although not represented as such in the Figures for simplification purposes).

Bloc 500 implements a control logic, for detecting the negative half cycle of the AC input voltage 12 and controlling the operations of blocs 300 and 400. Bloc 500 comprises a current detector 510, and two exclusive switch controllers 520 and 530. The first switch controller 520 is connected to switches 340 and 410, and the second switch controller 530 is connected to switch 420. Bloc 500 also comprises the zero volt reference 550 (common with the zero volt reference 15, although not represented as such in the Figures for simplification purposes), and an input 540 connected to the AC input voltage 12.

The operations of bloc 300 are dependent on switch 410 of bloc 400, thus bloc 500 controls the operations of bloc 300 by simultaneously actuating switch 340 and switch 410 via the first switch controller 520.

The aforementioned components of blocs 100, 200, 300, 400 and 500 (represented in FIG. 1B) are for illustration purposes only. Each bloc may include additional or different components, in order to implement the same functionalities.

Figure 2A:
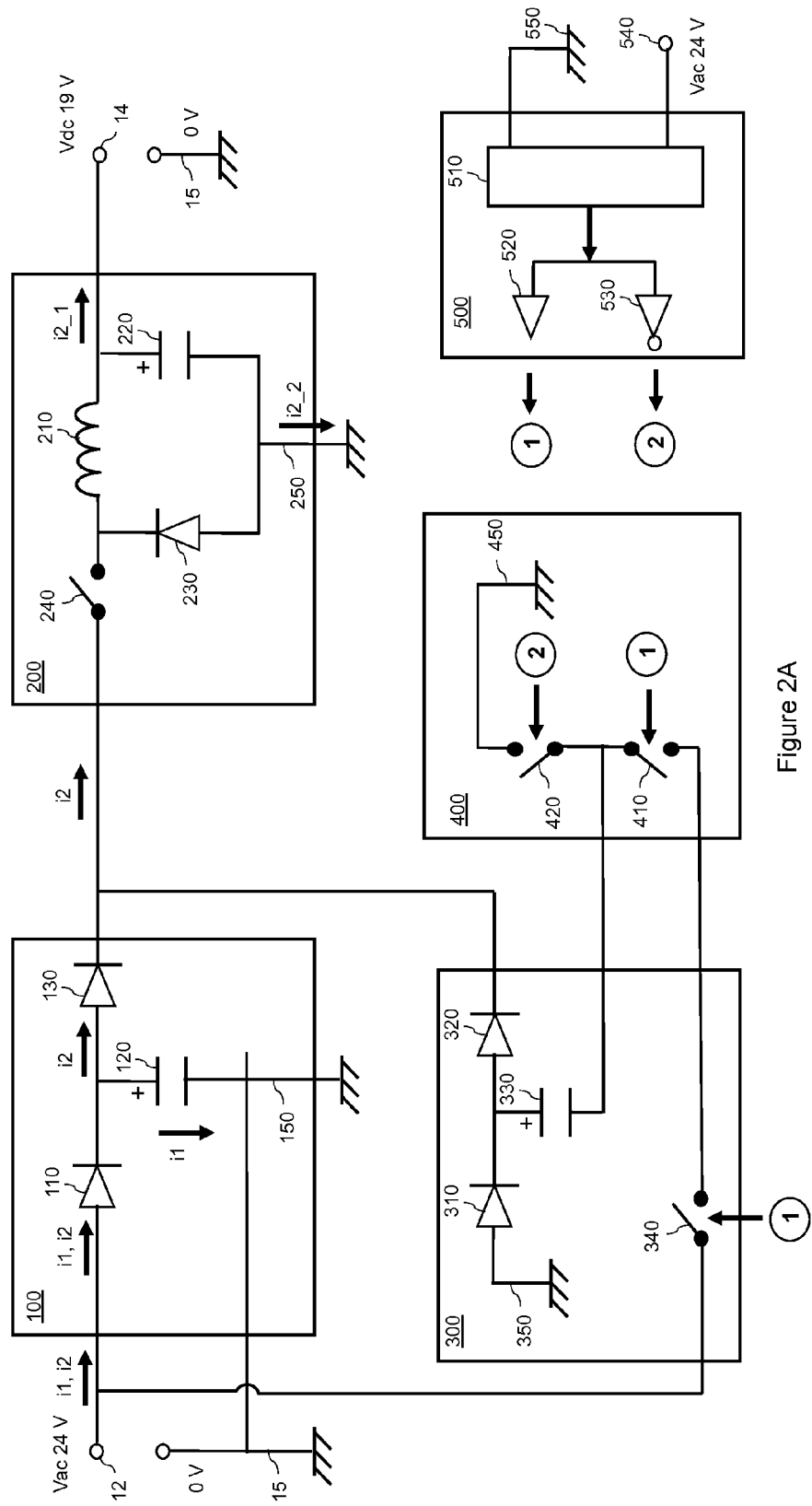
FIGS. 2A to 2E illustrate operations of the power supply of FIG. 1A.
Figure 2B:
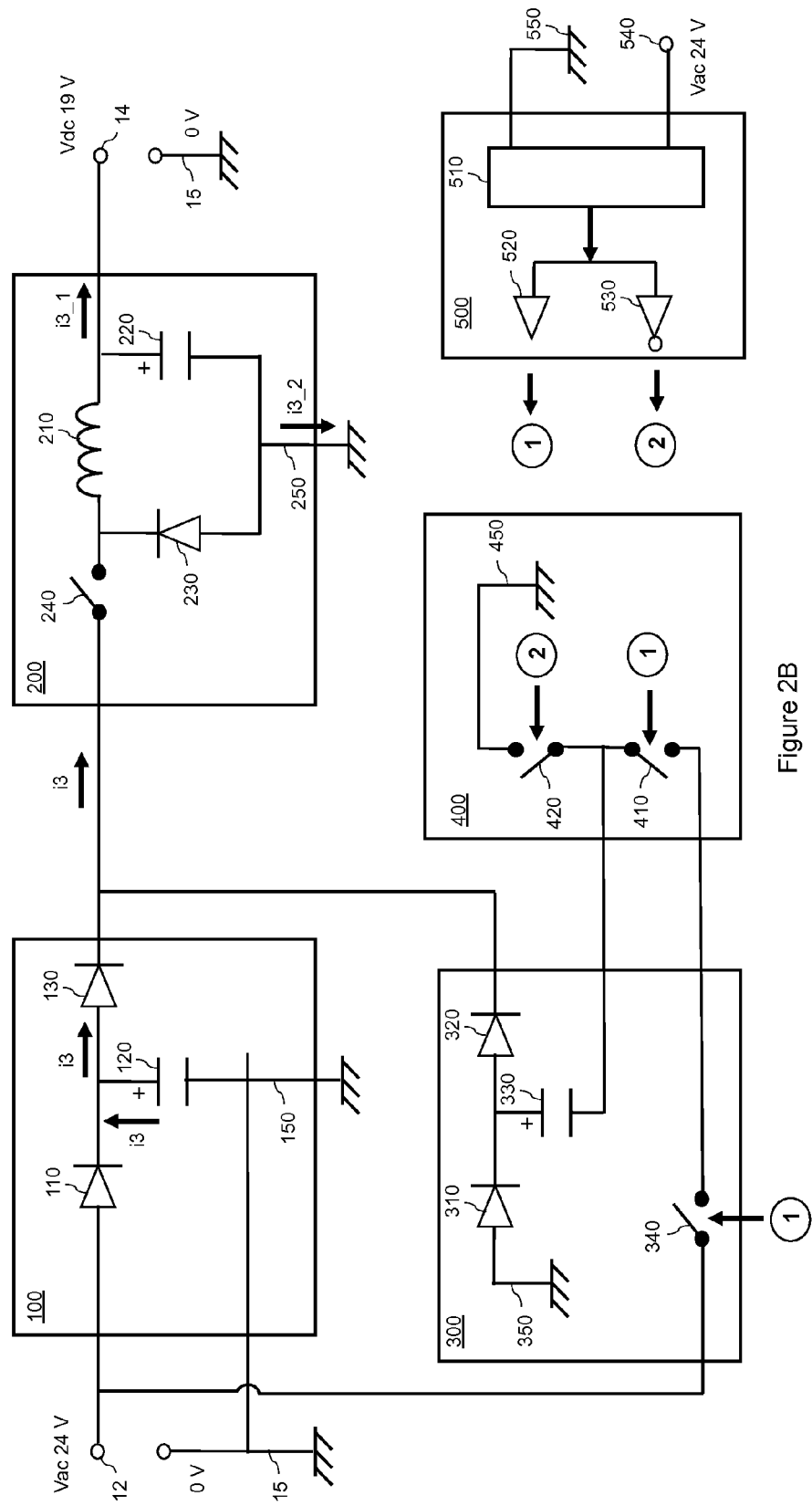

Referring now to FIGS. 1A, 2A and 2B, the operations of the power supply 10 during a positive half cycle of the AC input voltage 12 is represented. FIG. 2A corresponds to a first phase where the AC input voltage 12 increases from 0 V to its maximal value (e.g. 24.√2 V). FIG. 2B corresponds to a second phase where the AC input voltage 12 decreases from its maximal value (e.g. 24.√2 V) to 0 V.

Referring now particularly to FIG. 2A, during the first phase, only blocks 100 and 200 are active. The switch 340 in blocks 300, as well as the switches 410 and 420 in bloc 400 are inactive. Consequently, blocs 300 and 400 are inactive and no current circulates in these blocks.

Initially, the AC input voltage 12 increases starting at 0 V. A current i1 flows from the AC input 12 through the diode 110, the capacitor 120 and returns through the zero volt reference 150.

The resulting voltage applied to the capacitor 120 increases until it reaches a value equal to the maximum value (e.g. 24.√2 V) of the AC input voltage 12. Bloc 100 stores energy by charging the capacitor 120. This corresponds to the half-wave rectification of the positive half cycle. The speed at which the capacitor 120 is charged is directly correlated to the frequency of the AC input voltage 12.

Until the voltage applied to the capacitor 120 reaches the DC output voltage 14 (e.g. 19 V), bloc 200 does not receive any current from block 100. During this transitional phase, bloc 200 delivers an output voltage 14 proportional to an input voltage Vin, where Vin is the voltage at the entry (switch 240) of bloc 200. After the voltage applied to the capacitor 120 exceeds the DC output voltage 14 (e.g. 19 V), bloc 200 starts receiving a current from bloc 100. A current i2 flows from the AC input 12 through the diodes 110 and 130, and through bloc 200. Part of the current i2 (i2_1) is consumed by an electronic device electrically connected to the DC output 14 of bloc 200. Part of the current i2 (i2_2) is consumed by bloc 200, and returns through the zero volt reference 250. Bloc 200 performs a standard DC/DC power conversion to generate the DC output voltage 14 (e.g. 19 V), which can be used to power the electronic device electrically connected to the DC output 14.

Referring now particularly to FIG. 2B, during the second phase (the AC input voltage 12 decreases from its maximal value (e.g. 24.$\sqrt{2}$ V) to 0 V), only blocks 100 and 200 are active. The switches 340 and 410 respectively in blocks 300 and 400 are opened, while the switch 420 in block 400 is closed. Consequently, blocs 300 and 400 are inactive and no current circulates in these blocks.

Bloc 100 no longer receives current (i1 in FIG. 2A) from the AC input 12, since the voltage applied to the capacitor 120 exceeds the AC input voltage 12. Bloc 100 returns the energy stored via its capacitor 120 during the first phase, and transfers this energy to bloc 200, so that bloc 200 can provide the required energy at the DC output 14 (to power an electronic device electrically connected to the DC output 14), as it did during the first phase. A current i3 flows from the capacitor 120, through the diode 130, and through bloc 200. Part of the current i3 (i3_1) is consumed by an electronic device electrically connected to the DC output 14 of bloc 200. Part of the current i3 (i3_2) is consumed by bloc 200, and returns through the zero volt reference 250.

Figure 2C:
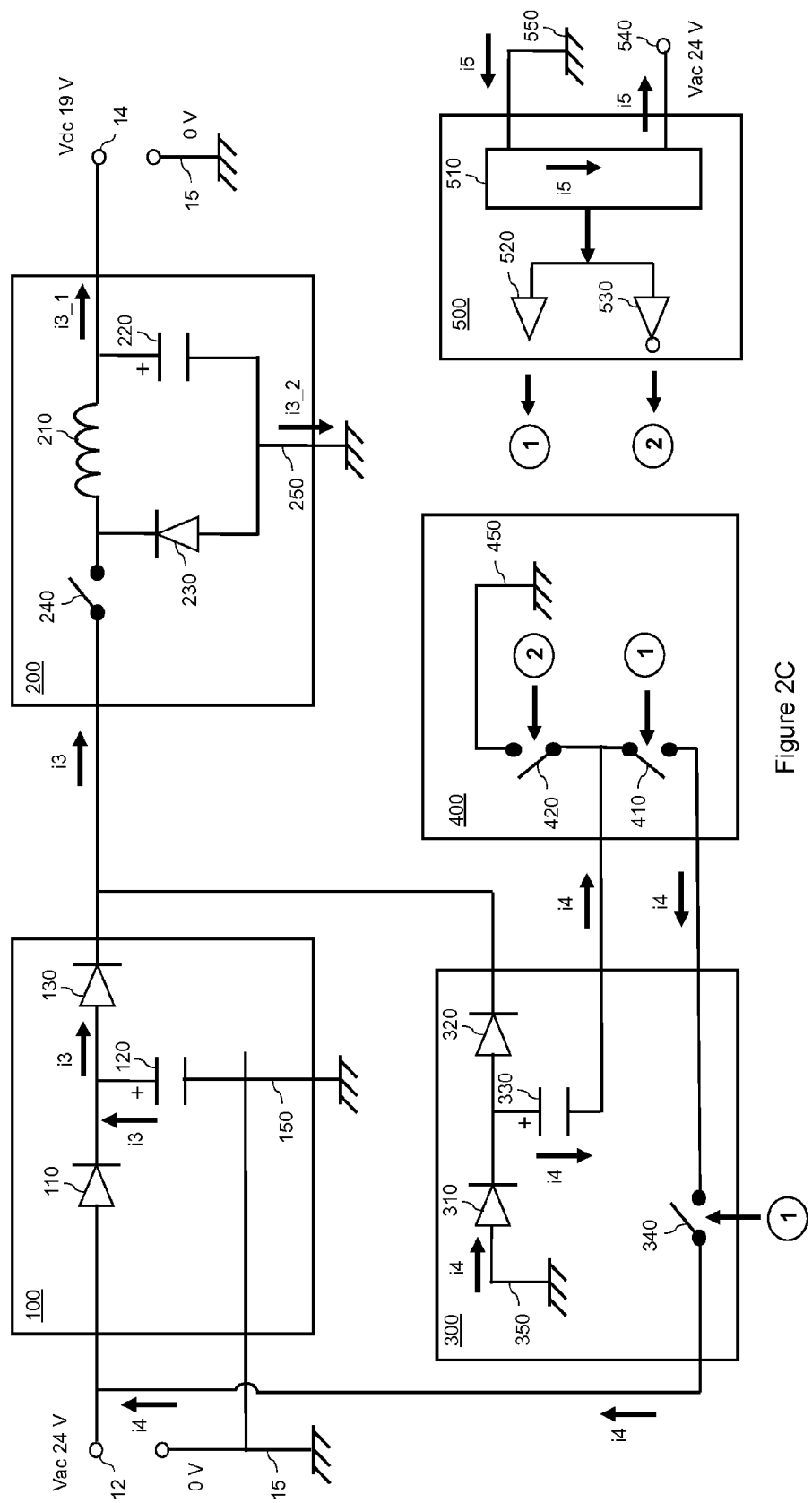
Figure 2D:
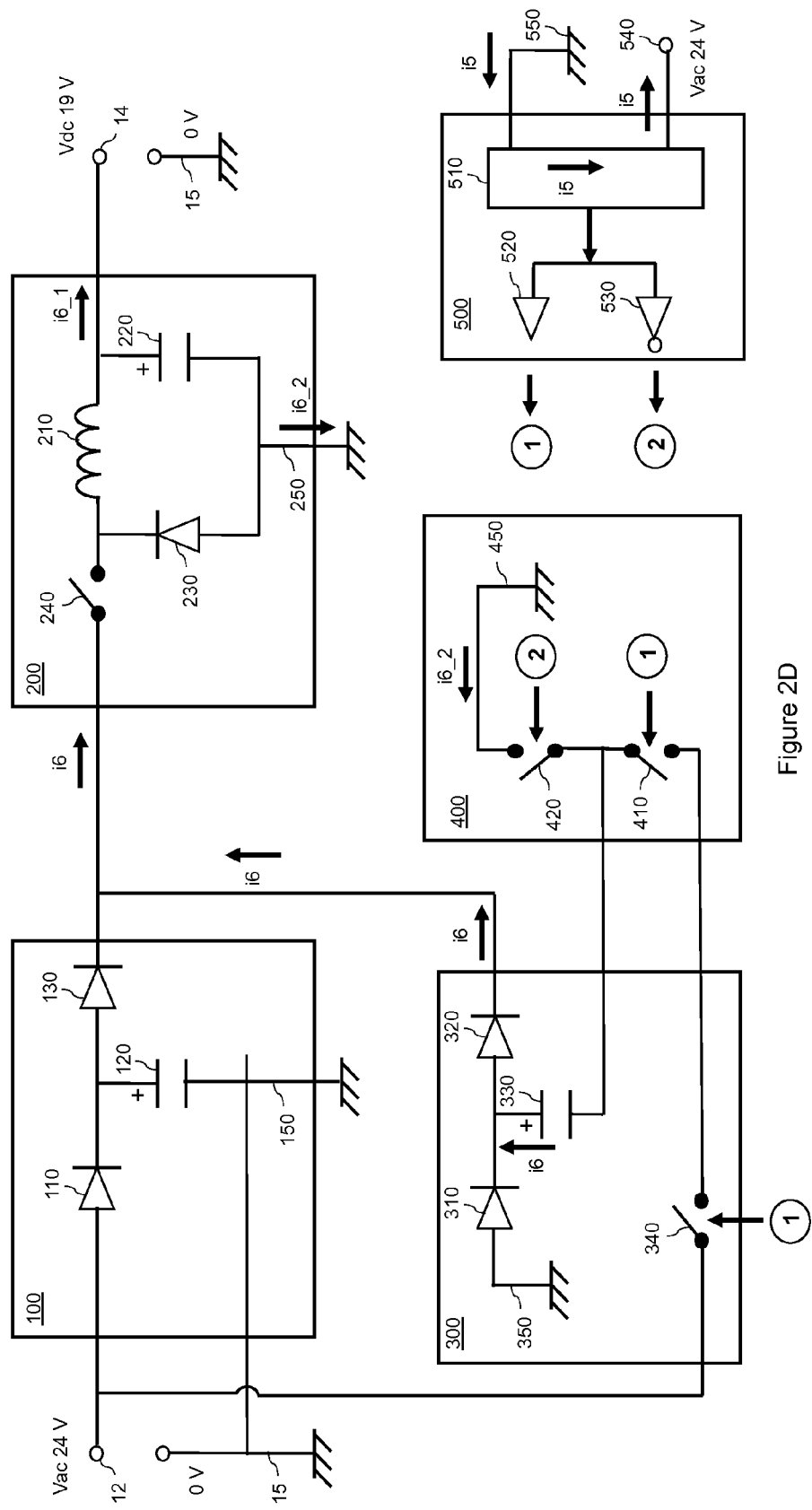

Referring now to FIGS. 1A, 2C and 2D, the operations of the power supply 10 during a negative half cycle of the AC input voltage 12 is represented. FIG. 2C corresponds to a third phase where the AC input voltage 12 decreases from 0 V to its minimal value (e.g. −24.$\sqrt{2}$ V). FIG. 2D corresponds to a fourth phase where the AC input voltage 12 increases from its minimal value (e.g. −24.$\sqrt{2}$ V) to 0 V.

Referring now particularly to FIG. 2C, during the third phase, all the blocks 100, 200, 300, 400 and 500 are active. Initially, the switches 340 and 410 respectively in blocks 300 and 400 are opened, while the switch 420 in block 400 is closed. Consequently, blocs 300 and 400 are inactive and no current circulates in these blocks. Blocs 100 and 200 are operating in a similar manner as in the second phase of the positive half cycle (described previously in relation to FIG. 2B), the current i3 flowing from the capacitor 120 of block 100 towards bloc 200 provides the energy of the DC output 14.

Bloc 500 implements a current detection functionality, to control the operations of blocs 300 and 400 based on the current it measures. It controls the switch 340 of block 300, and the switches 410 and 420 of block 400, to perform a transfer of energy from bloc 300 to bloc 200 during the negative half cycle of the AC input voltage 12.

Bloc 500 is connected to the AC input 12 via its input 540, and to the zero volt reference 550. During the negative half cycle of the AC input voltage 12, a negative current i5 circulates in the current detector 510 and is detected. During the positive half cycle of the AC input voltage 12, no current circulates in the current detector 510. Additionally, during the negative half cycle of the AC input voltage 12, a capacitor (not represented in the Figures) is charged and stores energy, which is used to power bloc 500 during the positive half cycle of the AC input voltage 12 (when no current circulates).

When current i5 (indicative of the negative half cycle of the AC input voltage 12) is detected by the current detector 510, an order is sent to block 400 to open switch 420 via the switch controller 530. The switch controllers 520 and 530 being exclusive, an order is also sent to block 400 to close switch 410 and to block 300 to close switch 340, via the switch controller 520. Consequently, bloc 300 is activated and stores energy by charging the capacitor 330. This corresponds to the half-wave rectification of the negative half cycle. The capacitor 330 is charged by a negative current i4 flowing from the zero volt reference 350 through the diode 310, the capacitor 330, the switch 410, the switch 340, and returning through the AC input 12.

Referring now particularly to FIG. 2D, during the fourth phase (the AC input voltage 12 increases from its minimal value (e.g. 24.$\sqrt{2}$ V) to 0 V), all the blocks 100, 200, 300, 400 and 500 are active. Initially, the switches 340 and 410 respectively in blocks 300 and 400 are closed, while the switch 420 in block 400 is opened.

The negative voltage at the input 540 of bloc 500 is no longer sufficient to charge the capacitor (not represented in the Figures) of bloc 500, and current i5 becomes null. This absence of current i5 is detected by the current detector 510, and is representative of an increasing AC input voltage 12. It is also an indicator that the capacitor 330 of bloc 300 is charged at its maximum capacity. An order is sent to block 400 to close switch 420 via the switch controller 530. The switch controllers 520 and 530 being exclusive, an order is also sent to block 400 to open switch 410 and to block 300 to open switch 340, via the switch controller 520.

Bloc 300 returns the energy stored via its capacitor 330 during the third phase, and transfers this energy to bloc 200, so that bloc 200 can provide the required energy at the DC output 14 (to power an electronic device electrically connected to the DC output 14). A current i6 flows from the capacitor 330, through the diode 320, the inductance 210, and through bloc 200. Part of the current i6 (i6_1) is consumed by the electronic device electrically connected to the DC output 14 of bloc 200. Part of the current i6 (i6_2) is consumed by bloc 200, and returns through the zero volt reference 250. Bloc 200 performs a power conversion where i6*Vin=i6_1*Vdc, where Vin is the voltage at the entry (switch 240) of bloc 200.

The fourth phase ends when the AC input voltage 12 is equal to 0. The whole cycle can start over with the first phase (the AC input voltage 12 increases from 0 V to its maximal value).

Figure 2E:
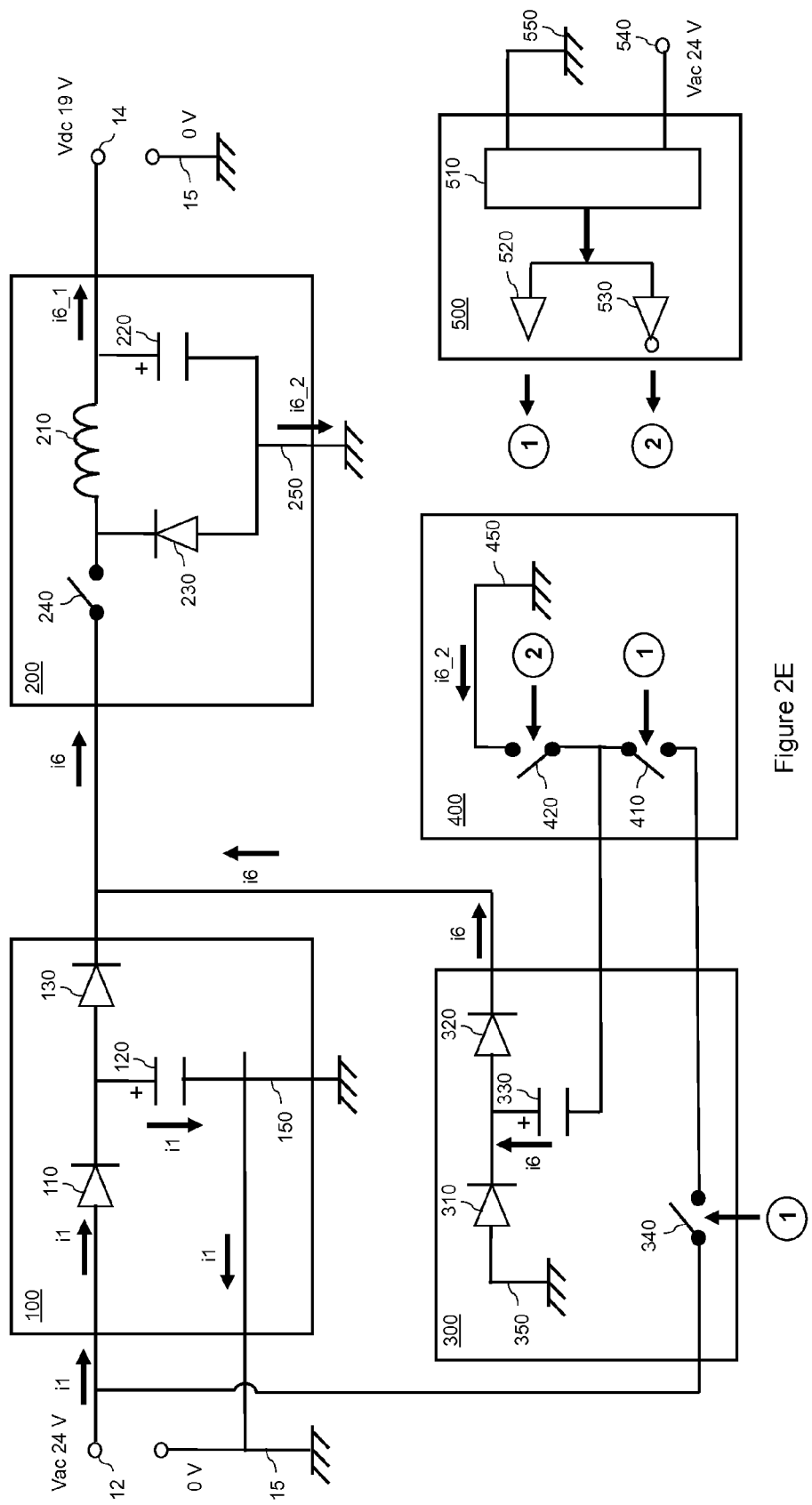

During the first phase, switch 420 remains closed, while switches 410 and 340 remain open. Thus, as illustrated in FIG. 2E, the current i6 flowing from the capacitor 330 of bloc 300 to bloc 200 provides energy to block 200, while the current i1 in block 100 charges the capacitor 120. At some point in the first phase, the voltage applied to capacitor 120 becomes higher than the voltage applied to capacitor 330, and the current i6 becomes null. Thus, bloc 200 no longer receives energy from the capacitor 330 of bloc 300 via current i6, but from bloc 100 via direct current i2, and later from the capacitor 120 via current i3 (as illustrated in FIGS. 2A and 2B).

Figure 3:
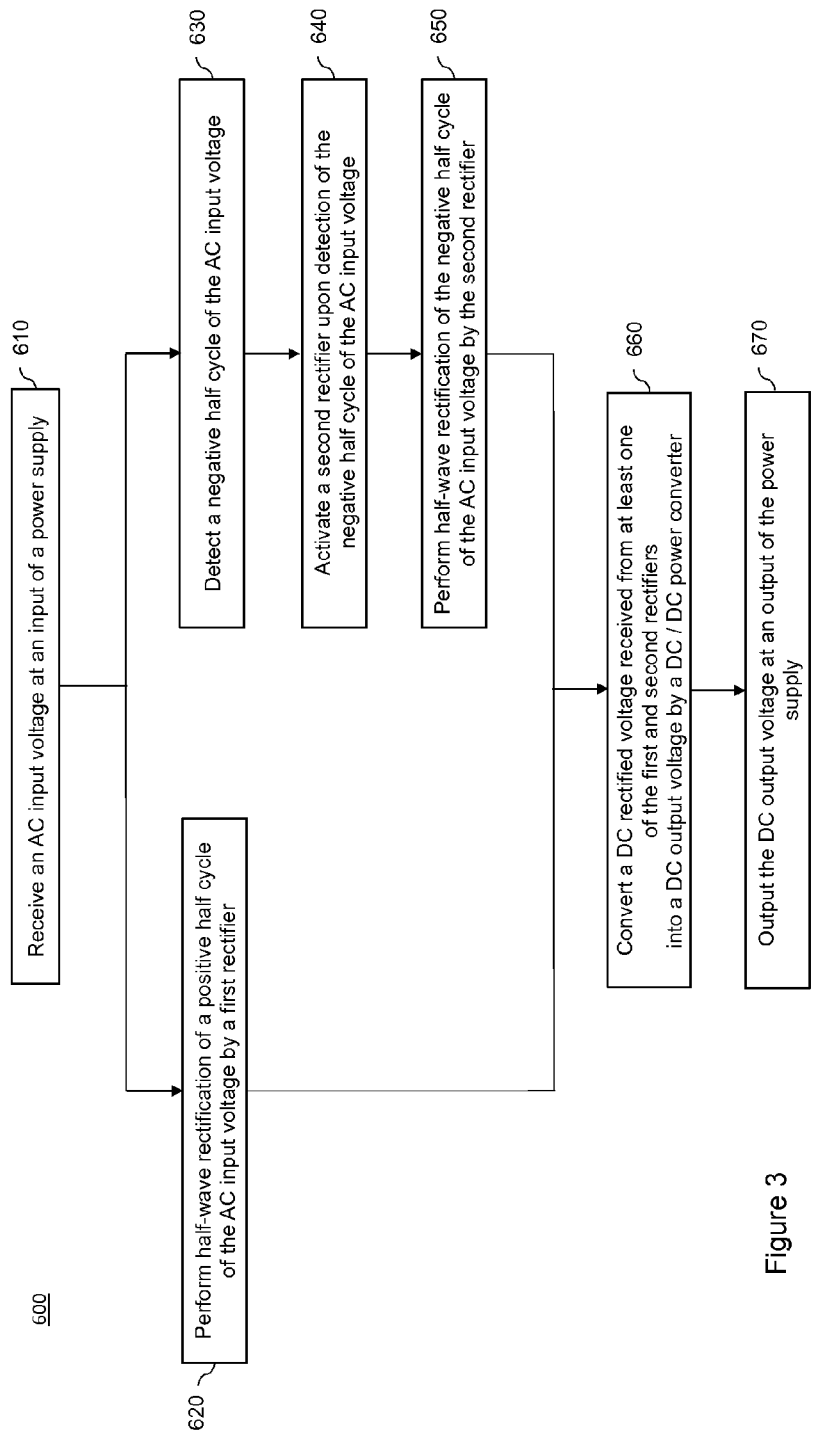
FIG. 3 represents a method of operating the power supply of FIG. 1A.

Referring now to FIGS. 1A, 1B and 3, a method 600 of operating a common zero volt reference AC/DC power supply (e.g. 10) with positive and negative rectification is represented in FIG. 3.

The method 600 comprises the step 610 of receiving an AC input voltage at an input (e.g. 12) of the power supply (e.g. 10).

The method 600 comprises the step 620 of performing a half-wave rectification of a positive half cycle of the AC input voltage (e.g. 12) by a first rectifier (e.g. bloc 100).

The method 600 comprises the step 630 of detecting a negative half cycle of the AC input voltage (e.g. 12).

The method 600 comprises the step 640 of activating a second rectifier (e.g. bloc 300) upon detection of the negative half cycle of the AC input voltage (e.g. 12).

The method 600 comprises the step 650 of performing a half-wave rectification of the negative half cycle of the AC input voltage (e.g. 12) by the second rectifier (e.g. bloc 300).

The method 600 comprises the step 660 of converting a DC rectified voltage received from at least one of the first (e.g. bloc 100) and second (e.g. bloc 300) rectifiers into a DC output voltage (e.g. 14) by a DC/DC power converter (e.g. bloc 200).

The method 600 comprises the step 670 of outputting the DC output voltage at an output (e.g. 14) of the power supply (e.g. 10). The AC input voltage and the DC output voltage have a common zero volt reference (e.g. 15).

In a particular aspect of the method 600, the DC/DC power converter (e.g. bloc 200) is a buck-type converter.

In another particular aspect of the method 600, the AC input voltage (e.g. 12) varies between $-24.\sqrt{2}$ V and $+24.\sqrt{2}$ V.

In still another particular aspect of the method 600, the AC input voltage (e.g. 12) varies between $-24.\sqrt{2}$ V and $+24.\sqrt{2}$ V, and the DC output voltage (e.g. 14) is equal to 19 V.

The DC output voltage (e.g. 14) may have another fixed value. For example, the DC output voltage (e.g. 14) may have a value between 0 and 30 V. The value of the AC input voltage (e.g. 12) is adapted to match the value of the DC output voltage (e.g. 14). The aforementioned values for the AC input voltage (e.g. 12) and the DC output voltage (e.g. 14) are for illustration purposes only In a particular aspect of the method 600, step 620 of the method 600 further comprises storing energy during a first phase of the positive half cycle at the first rectifier (e.g. bloc 100), and transferring the stored energy to the DC/DC power converter (e.g. bloc 200) during a second phase of the positive half cycle. For instance, the energy is stored at a capacitor (e.g. 120) of the first rectifier (e.g. bloc 100).

In another particular aspect of the method 600, step 650 of the method 600 further comprises storing energy during a first phase of the negative half cycle at the second rectifier (e.g. bloc 300), and transferring the stored energy to the DC/DC power converter (e.g. bloc 200) during a second phase of the negative half cycle. For instance, the energy is stored at a capacitor (e.g. 330) of the second rectifier (e.g. bloc 300).

In still another particular aspect of the method 600, the detection of the negative half cycle of the AC input voltage (e.g. 12) is performed by a control logic (e.g. bloc 500) of the power supply (e.g. 10). For this purpose, an input (e.g. 540) of the control logic (e.g. bloc 500) may be connected to the AC input (e.g. 12) for detecting the negative half cycle of the AC input voltage.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A common zero volt reference AC/DC power supply with positive and negative rectification, comprising:
    an input for receiving an alternating current (AC) input voltage;
    an output for outputting a direct current (DC) output voltage, the AC input voltage and the DC output voltage having a common zero volt reference;
    a first rectification circuit for performing a half-wave rectification of a positive half cycle of the AC input voltage into a first rectified DC voltage;
    a second rectification circuit for performing a half-wave rectification of a negative half cycle of the AC input voltage into a second rectified DC voltage;
    control logic for detecting if the AC input voltage is in the negative half cycle, activating the second rectification circuit when the AC input voltage is in the negative half cycle by allowing current to circulate in the second rectification circuit, and de-activating the second rectification circuit when the AC input voltage is not in the negative half cycle by preventing current to circulate in the second rectification circuit;
    a DC/DC power converter for converting the first rectified DC voltage and the second rectified DC voltage received respectively from the first and second rectification circuits into the DC output voltage.

2. The power supply of claim 1, wherein the common zero volt reference of the AC input and DC output voltages is shared with at least one of the following: the first rectification circuit, the second rectification circuit, the control logic and the DC/DC power converter.

3. The power supply of claim 1, wherein the DC/DC power converter is a buck-type converter.

4. The power supply of claim 1, wherein the AC input voltage varies between $-24.\sqrt{2}$ V and $+24.\sqrt{2}$ V.

5. The power supply of claim 4, wherein the DC output voltage is equal to 19 V.

6. The power supply of claim 1, wherein the DC output voltage has a value between 0 and 30 V.

7. The power supply of claim 1, wherein the first rectification circuit comprises a capacitor for storing energy during a first phase of the positive half cycle and transferring the stored energy to the DC/DC power converter during a second phase of the positive half cycle.

8. The power supply of claim 1, wherein the second rectification circuit comprises a capacitor for storing energy during a first phase of the negative half cycle and transferring the stored energy to the DC/DC power converter during a second phase of the negative half cycle.

9. The power supply of claim 1, wherein an input of the control logic is connected to the AC input for detecting the negative half cycle of the AC input voltage.

10. A method of operating a common zero volt reference AC/DC power supply with positive and negative rectification, comprising:
    receiving an alternating current (AC) input voltage at an input of the power supply;
    performing a half-wave rectification of a positive half cycle of the AC input voltage into a first rectified DC voltage by a first rectification circuit;
    detecting if the AC input voltage is in a negative half cycle;
    activating a second rectification circuit when the AC input voltage is in the negative half cycle by allowing current to circulate in the second rectification circuit;
    de-activating the second rectification circuit when the AC input voltage is not in the negative half cycle by preventing current to circulate in the second rectification circuit;
    performing when the second rectification circuit is activated a half-wave rectification of the negative half cycle of the AC input voltage into a second rectified DC voltage by the second rectification circuit;
    converting the first rectified DC voltage and the second rectified DC voltage received respectively from the first and second rectification circuits into a DC output voltage by a DC/DC power converter; and outputting the DC output voltage at an output of the power supply;

wherein the AC input voltage and the DC output voltage have a common zero volt reference.

11. The method of claim 10, wherein the common zero volt reference of the AC input and DC output voltages is shared with at least one of the following: the first rectification circuit, the second rectification circuit, the control logic and the DC/DC power converter.

12. The method of claim 10, wherein the DC/DC power converter is a buck-type converter.

13. The method of claim 10, wherein the AC input voltage varies between $-24.\sqrt{2}$ V and $+24.\sqrt{2}$ V.

14. The method of claim 13, wherein the DC output voltage is equal to 19 V.

15. The method of claim 10, wherein the DC output voltage has a value between 0 and 30 V.

16. The method of claim 10, further comprising storing energy during a first phase of the positive half cycle at the first rectification circuit, and transferring the stored energy to the DC/DC power converter during a second phase of the positive half cycle.

17. The method of claim 10, further comprising storing energy during a first phase of the negative half cycle at the second rectification circuit, and transferring the stored energy to the DC/DC power converter during a second phase of the negative half cycle.

18. The method of claim 10, wherein the detection of the negative half cycle of the AC input voltage is performed by a control logic of the power supply.

19. The method of claim 18, wherein an input of the control logic is connected to the AC input for detecting the negative half cycle of the AC input voltage.

* * * * *